United States Patent [19]
Hartog

[11] 3,857,582
[45] Dec. 31, 1974

[54] VEHICLE LEVELING SYSTEM

[76] Inventor: Michael Hartog, 650 N. Bronson Ave., Los Angeles, Calif. 90004

[22] Filed: May 17, 1974

[21] Appl. No.: 470,986

[52] U.S. Cl. .......................... 280/150.5, 248/354 R
[51] Int. Cl. .............................................. B60s 9/02
[58] Field of Search ............. 280/150.5; 248/354 R; 254/86 R, 86 H

[56] References Cited
UNITED STATES PATENTS

| | | | |
|---|---|---|---|
| 2,734,726 | 2/1956 | Gebhart | 280/150.5 |
| 3,096,065 | 7/1963 | Horne | 280/150.5 |
| 3,450,415 | 6/1969 | Martin | 280/150.5 |
| 3,656,778 | 4/1972 | Bristol | 280/150.5 |
| 3,767,226 | 10/1973 | Stephens | 280/150.5 |

*Primary Examiner*—Robert R. Song
*Attorney, Agent, or Firm*—Fulwider Patton Rieber Lee & Utecht

[57] ABSTRACT

A vehicle leveling system consisting of four hydraulic jacks pivotally mounted on the underside of a vehicle at each corner thereof. The jacks are movable between a retracted position where the longitudinal axis of the jack is substantially parallel to the longitudinal axis of the vehicle, to an extended ground-engaging position where the longitudinal axis of the jack is substantially normal to the longitudinal axis of the vehicle. Linkages extend between the jacks and the vehicle for rotating the jack between the retracted position and the extended position responsive to the extension and contraction of the jack. Control means are provided for automatically sensing the tilt of the vehicle and selectively extending one or more of the jacks until the vehicle is level. The unextended jacks can then be extended to stabilize the vehicle.

17 Claims, 6 Drawing Figures

PATENTED DEC 31 1974
3,857,582
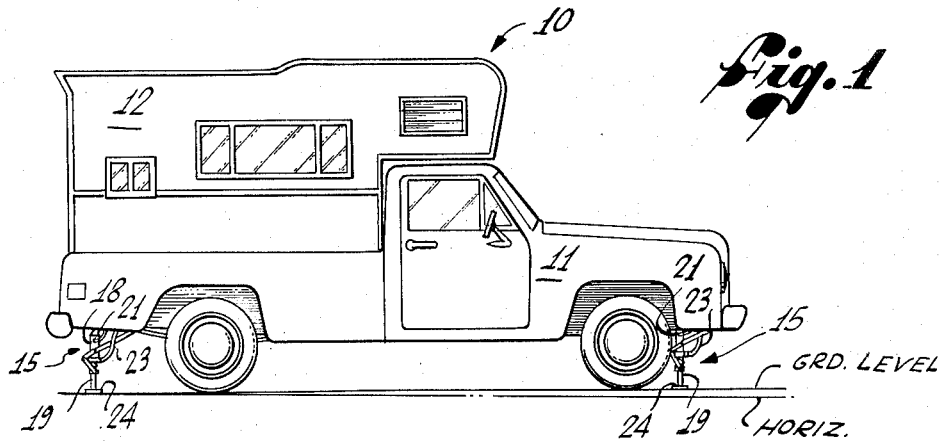
Fig.1
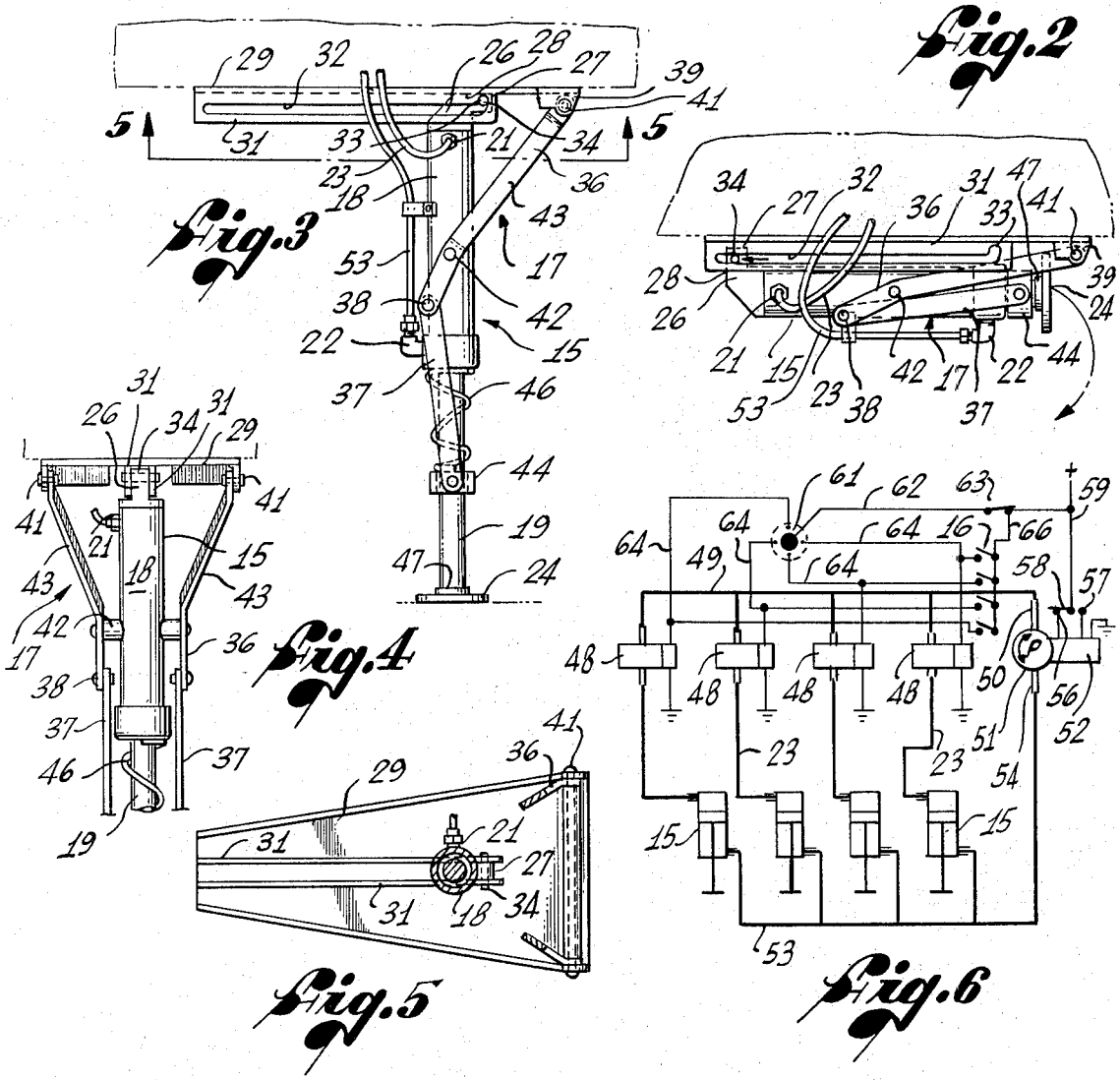
Fig.2
Fig.3
Fig.4
Fig.5
Fig.6

3,857,582

VEHICLE LEVELING SYSTEM

BACKGROUND OF THE INVENTION

This invention relates to vehicle leveling systems and more particularly to leveling systems for recreational vehicles and the like where the leveling members are movable between a folded, retracted position when not in use to an extended, ground-engaging position for leveling the vehicle.

In using travel trailers, recreational vehicles and the like, it is highly desirable to provide means for leveling the vehicle when parked in the field. Leveling the vehicle is important not only from the standpoint of enjoyment and convenience of the vehicle, but also from the standpoint of proper functioning of the various systems in the vehicle, such as built-in water systems and the like.

Automatic leveling systems of the general type described herein are known in the prior art and generally comprise extendable jacks located at the corners of the vehicle, and a level sensing and control system which is connected to driving means for extending the jacks to level the vehicle. In such systems, the jacks are normally fixed so that the longitudinal axes of the jacks are substantially vertical. Such a system, if not built into the vehicle initially, requires a substantial modification of the frame of the vehicle in order to accommodate the jacks or requires positioning the jacks on the exterior of the vehicle in an unsightly manner. Furthermore, such systems are not readily adaptable for mounting on the smaller recreational vehicles such as a 3/4 ton truck carrying a camper body since there is normally insufficient space beneath the truck to accommodate the upstanding jacks and the associated drive means. An alternative is to locate the jacks on the truck exterior where they are exposed in an unsightly manner and require additional supporting structure to carry the weight of the vehicle.

Accordingly, these prior devices have been only partially successful in providing a satisfactory vehicular leveling system. The present invention provides an improved leveling system which can easily be mounted on the underside of a vehicle with little or no structural modification of the vehicle and which includes leveling members that are compactly folded beneath the vehicle when not in use.

SUMMARY OF THE INVENTION

In accordance with the present invention, hydraulically operated leveling members are located on the underside of a vehicle and are so mounted as to be movable between an extended, ground-engaging position and a retracted, folded position when not in use. The upper end of each of the leveling members is slidably, pivotally connected to a base carried by the vehicle underside. The base provides a surface against which the upper end of the leveling member bears when the member is in the upright position and the base also carries means for guiding the upper end of the leveling member as it shifts between the retracted position and the upright position.

More particularly, the leveling members are hydraulic jacks which include a cylinder and an extensible, ground-engaging rod. A scissors linkage extends between the vehicle and the rod, and one arm of the linkage is pivotally attached to the leveling member. Moving the arms of the scissors linkage together responsive to the retraction of the rod rotates the leveling member from a substantially vertical position to a folded position beneath the vehicle. Likewise, moving the arms of the linkage apart rotates the leveling member into the substantially vertical ground-engaging position.

The leveling members preferably are hydraulically operated from a single pump. A suitable level sensing switch is provided for initiating operation of the pump and selectively controlling the flow of fluid to individual leveling members for selectively extending one or more members to move to the extended position in order to level the vehicle and to terminate the pumping action when the vehicle is level. Manual control means are provided to retract the leveling members preparatory to moving the vehicle.

Other aspects and advantages of the invention will become apparent from the following detailed description, taken in conjunction with the accompanying drawings.

BRIEF DESCRIPTION OF THE DRAWINGS

FIG. 1 is a side elevation showing a recreational vehicle having a leveling system embodying the present invention, the leveling system being shown with the leveling members in the ground-engaging position;

FIG. 2 is an enlarged fragmentary side elevation of a leveling member in the retracted position;

FIG. 3 is an enlarged side elevation of a leveling member in the extended ground-engaging position;

FIG. 4 is a fragmentary front elevation taken from one side in FIG. 3;

FIG. 5 is a bottom plan view partially in section taken along line 5—5 of FIG. 3; and FIG. 6 is a schematic diagram of the electrical and hydraulic circuitry for control and operation of the leveling members.

DETAILED DESCRIPTION OF THE INVENTION

As shown in the drawings, the invention is embodied in a vehicle leveling system wherein leveling members 15 are mounted on the underside of a vehicle, indicated generally as 10, preferably with a leveling member located adjacent each corner of the vehicle. Each of the leveling members is mounted so as to be movable between an extended, upright position and a retracted, folded position beneath the vehicle for storage when the leveling system is not in use.

The leveling members 15 are hydraulically operated and any conventional control system may be employed to control the flow of hydraulic fluid to each of the individual leveling members for the extension and retraction thereof. In the preferred embodiment the control system is sensitive to the tilt of the vehicle so that when activated, the leveling members are selectively extended until the vehicle is level. Retraction and folding of the leveling members is likewise controlled by switches 16 that may be conveniently located within the vehicle.

In accordance with the primary aspect of the invention, each of the leveling members 15 is slidably mounted on the underside of the vehicle 10 and a scissors linkage indicated generally as 17, is connected between the vehicle and the leveling member to slidably pivot the leveling member between the extended position and the retracted position, responsive to the extension and contraction of the leveling member.

As is more specifically illustrated in FIGS. 1 through 5, two leveling members 15 are located adjacent the forward and rear corners of the vehicle 10, illustracted herein as a light open-bed truck 11 carrying a camper body 12. Each leveling member 15 is a hydraulic jack consisting of a cylinder 18 and an extendable cylinder rod 19 designed for telescoping travel within the cylinder body responsive to the flow of hydraulic fluid. Fittings 21 and 22 communicate with the upper and lower portions of the cylinder body respectively for leading in hydralic fluid through flexible lines 23. The end of the rod opposite the cylinder body is provided with a ground-engaging plate 24, and the end of the cylinder body opposite the rod is provided with a carrier head 26 on which is integrally formed a laterally extending body 27. This body has a bearing surface 28 for supporting the vehicle 10 when the leveling member is in the extended position.

A base member 29 is welded or bolted to the frame of the vehicle 10 at the location of the leveling member 15. A pair of spaced, depending, guide flanges 31 are carried by the base and extend parallel to the longitudinal axis thereof. Extending along each of the flanges 31 is an elongated closed ended slot 32 and one end of each of the slots is provided with an upwardly extending detent notch 33. A pin 34 in the carrier head 26 extends through the slots and cooperates therewith to guide the upper end of the leveling member as it moves back and forth between the extended position and the retracted position, and to lock the carrier head when the leveling member is fully extended and in engagement with the ground.

Pivoting of the leveling member 15 between a substantially vertical position and a substantially horizontal position is accomplished by means of the scissors linkage 17. In the preferred embodiment, scissors linkages are employed in pairs, with one of the scissors linkages on each side of the leveling member for stabilization of the member when it is in the extended position.

Each scissors linkage 17 consists of a crank arm 36 and an actuating link 37, each of which is commonly pivoted at one end at 38. The crank arm is pivotally connected at its opposite end to a tab 39 carried by the base member 29 by means of bolt 41 which extends through aligned apertures in the end of the crank arm and the tab. The cylinder 18 is pivotally carried at point 42 by the crank arm. As is best seen in FIG. 4, a portion 43 of the crank arm extending between the leveling member and the base member is angled away from the leveling member so that in the extended position the crank arms define a Y-shaped bracket for stabilizing the leveling member.

The actuating link 37 is pivotally connected at its opposite end to a slidable collar 44 which is slidably carried along the extendable rod 19. A normally uncompressed helical spring 46 surrounds the rod and acts against the lower end of the cylinder 18 and the slidable collar to urge the movable collar in a position normally extended away from the cylinder body. The ground-engaging plate 24 is provided with a raised collar 47 for engagement with the movable collar during retraction of the rod.

The leveling member is moved from its extended position, FIG. 3, to its retracted position, FIG. 2, when hydraulic fluid under pressure enters the lower portion of the cylinder 18 through the flexible line 23 and the fitting 22, causing the rod 19 to be raised. When the rod begins to rise, the carrier head 26 drops away from the base member 29 and drops downwardly out of the detent notch 33 freeing the upper end of the cylinder body for pivoting and for movement along the guide flanges 31. As the rod is contracted, it slides through the slidable collar 44 which is restrained by the helical spring 46. Continued contraction of the rod causes the raised collar 47 on the ground plate 24 to contact the under surface of the slidable collar, urging it upwardly toward the cylinder body, pivoting the actuating link 37 and crank arm 36 of the scissors linkage 17 together and compressing the spring 46. As the movable collar moves upwardly, the actuating link begins to urge the crank arm in a clockwise direction, causing the leveling member to rotate in a counterclockwise direction about the point 42 and the upper end of the leveling member rotates about the pin 34. Rotation of the leveling member also forces the upper end thereof to move in a direction away from the detent notch and the pin 34 slides in the slot 32. When the rod is fully contracted, the leveling member is folded beneath the vehicle and the crank arm and actuating link are scissored together.

The retracted leveling member 15 is extended by hydraulic fluid introduced into the upper portion of the cylinder 18 through the flexible line 23 and the upper fitting 21 causing the cylinder rod 19 to begin to extend out of the cylinder body. As the cylinder rod extends, the spring 46 urges the slidable collar 44 away from the cylinder body, causing the arms of the scissors linkage 17 to begin to open and to rotate the leveling member in a clockwise direction. The upper end of the cylinder moves in a direction towards the detent notch 33 and the pin 34 slides in the slot 32 toward the detent notch and is aligned therewith when the leveling member is in a substantially vertical position. After the ground plate 24 of the cylinder rod contacts the surface, the cylinder body is moved upwardly, moving the bearing surface 28 of the carrying head 26 against the base 29 and engaging the pin 34 in the detent notch to lock the upper end of the cylinder body. The cylinder rod then is extended until the vehicle is leveled.

As is more specifically shown in FIG. 6, the leveling members 15 are connected through their upper fittings 21 and flexible lines 23 to electrically operated solenoid valves 48 which control the flow of hydraulic fluid for extending the leveling members. The solenoid valves are connected by a conduit 49 to a first output 50 reversible pump 51, which is driven by a reversible electric motor 52, and a source of hydraulic fluid, not shown. The lower fittings 22 of the leveling members communicate directly with a conduit 53 which is connected to a second output 54 of the reversible pump for retracting the leveling members.

The electric motor 52, of conventional design, is provided with terminals 56 and 57 and a switch 58 for selectively connecting the motor to a source of current through a line 59 from a source of current, such as an automatic battery, not shown. Reversing the position of the switch, reverses the direction of the motor and the pump 51.

The solenoid valves 48 are electrically controlled by circuitry including a level-sensitive mercury switch 61 of conventional design which is connected to the line 59 by line 62. Switch 63 is provided in the line 62 for activating the mercury switch 61. Lines 64 connect the mercury switch 61 with each of the solenoid valves.

The manual switches 16 are provided for controlling the solenoid valves 48 when the switch 58 is in contact with the terminal 57 of the motor 52 for activating the 5 valves when the circuitry is in the retracting mode.

A master switch, not shown, is provided for controlling the flow of current to the line 59.

In operation, the leveling system is activated by closing the master switch and the switch 63, completing the electrical circuit to the mercury switch 61 and to the motor 52. As illustrated, the circuit is in the leveling mode with the switch 58 contacting terminal 56, the motor 52 driving the pump 51 for pumping the hydraulic fluid through the first output 50, the line 49 to the solenoid valves 48. Depending on the position of the vehicle, the mercury switch activates the solenoid valves 48 through the lines 64 to open one or more of the solenoid valves and allow hydraulic fluid to be pumped into the upper portion of the leveling members through the flexible line 23 and the upper fitting 21. When the vehicle is level, the mercury switch breaks contact and the solenoid valves are closed.

It should be noted that the motor 52 and the pump 51 continue to operate with the fluid being passed through a pressure actuated by-pass, not shown, and returned to the reservoir as is common with conventional hydraulic systems. Any leveling members not extended during the leveling operation may be extended to stabilize the vehicle by opening the respective solenoid valves by the manual switch 16 which form a circuit between the solenoid valves and the terminal 56 by a line 66.

To retract the leveling members into their folded positions beneath the vehicle, the switch 58 is moved into contact with the terminal 57, reversing the direction of the motor 52 and of the pump 51 to pump hydraulic fluid through the second output 51, the conduit 53 into the lower portion of each of the leveling members. All of the switches 16 are closed activating each of the solenoid valves 48 to allow the hydraulic fluid to flow back through the flexible lines 23 and the conduit 49 to the reservoir. When the leveling members are fully retracted, the increased pressure exerted by the hydraulic fluid will activate the pressure by-pass so that the leveling members and the associated hydraulic lines are not damaged. The switches 16 are reopened and the solenoid valves returned to their normally closed positions. The switch is opened, breaking the motor circuit to deactivate the pumping system.

The present invention provides a leveling system which may be conveniently installed on a vehicle without substantial modification of the vehicular structure. The system is convenient to use and is operable without the necessity of cumbersome and expensive equipment. In the retracted position, the leveling members are folded beneath the vehicle for over-the-road travel and are substantially concealed. When extended, the leveling members provide a stable and level platform which adds substantially to the comfort and convenience of the vehicle.

It will be evident that, while specific embodiments of the invention have been illustrated and described, various modifications and changes may be made without departing from the spirit and scope of the invention.

I claim:

1. A retractable jack assembly for a vehicle, comprising:
   a longitudinally extendable and contractable jack having an upper end portion for attachment to the vehicle and an extendable lower end portion for engagement with the ground;
   means on said upper end for mounting said jack on the vehicle including
   a base,
   a pivot defining a substantially horizontal axis for said jack supporting the latter on said base for swinging between an upright, active position and an upwardly folded, retracted position;
   means guiding said pivot for back and forth movement along said base transversely of said axis; and linkage means connected between said base and said jack for swinging the jack to said active position and shifting said pivot along said base in one direction in response to extension of the jack when the latter is in said retracted position, said linkage means also being responsive to contraction of said jack when the latter is in said active position to swing the jack back to the retracted position while shifting said pivot back along said base in the opposite direction.

2. The retractable assembly as defined in claim 1 wherein said means guiding said pivot includes;
   an elongated track; and
   said pivot comprises a transversely extending element on said upper end portion slidably, pivotally carried by said track.

3. The retractable assembly as defined in claim 2 wherein said track is provided with an elongated slot running parallel to the longitudinal axis of said track and said pivot element extends through said slot.

4. The retractable assembly as defined in claim 1 further including;
   a member mounted on said lower end portion of said jack for longitudinal sliding thereon;
   means urging said member along said lower end portion away from said upper end portion; and
   an abutment adjacent the lower end of said jack engageable with said member.

5. The retractable assembly of claim 4 wherein said linkage means comprises:
   at least one elongated crank arm pivotally connected at one end to said base adjacent said guiding means, and pivotally connected between its ends to said upper end portion in spaced relation with said pivot; and
   an actuating link pivotally connected at one end to the end of said crank opposite said one end connected to said base and at its other end to said member;
   said crank, said link and said guide means cooperating to cause said linkage to unfold and fold said jack upon extension and contraction thereof, and said member permitting further extension of said jack after it is in said upright position.

6. The retractable assembly of claim 1 wherein one end portion of said jack comprises a hydraulic cylinder; and
   the other end portion of said jack comprises an extensible, contractable rod telescopingly carried in said cylinder;

said cylinder being adapted to receive fluid for extending and contracting said rod responsive to the driving force of said fluid in said cylinder.

7. A retractable jack assembly for leveling a vehicle, comprising:
 a longitudinally extendable and contractable jack having an upper end portion for attachment to the vehicle and an extendable lower end portion for engagement with the ground;
 a member mounted on said lower end portion for longitudinal sliding thereon;
 means yieldably urging said member along said lower end portion away from said upper end portion;
 an abutment adjacent the lower end of said jack engageable with said member;
 means forming a slidable pivot between said upper end portion and said base including an elongated track, and a pivot on said upper end portion slidable back and forth along said track;
 at least one elongated crank arm pivotally connected at one end to said base adjacent one end of said track, and pivotally connected between its ends to said upper end portion in spaced relationship with said pivot; and
 an actuating link pivotally connected at one end to the end of said crank opposite said one end, and at its other end to said member;
 said crank, said link and said track cooperating to unfold and fold said jack upon extension and contraction thereof, and said member further permitting further extension of said jack after it is in said upright position.

8. The retractable assembly of claim 7 further including:
 a carrying head on said upper end of said jack, said carrying head defining an upper bearing surface for contact with said base when said jack is in an upright active position;
 a pivot pin extending laterally from said carrier head for slidable, pivotal engagement with said track.

9. The retractable assembly as defined in claim 7 wherein said elongated track comprises:
 a pair of spaced apart, parallel running flanges;
 an elongated slot in each of said flanges running parallel to the longitudinal axis thereof;
 an upwardly extending detent notch located at the end of each of said slots adjacent the connection of said crank arm, said detent notches being aligned for receiving said laterally extending pin of said carrier head to permit said bearing surface to urge against said base and to lock said upper portion of said jack when said jack is in the extended active position.

10. The jack assembly of claim 7 wherein said upper portion of said jack is pivotally connected between a pair of said crank arms and having an actuating link pivotally connected between each crank arm and said member.

11. The retractable assembly as defined in claim 10 wherein a portion of each of said crank arms extending between the connection to said upper end portion and the end pivotally connected to said base is angled away from said jack thereby to define a Y-shaped stabilizing bracket when said jack is in the upright position.

12. The retractable assembly as defined in claim 7 wherein said upper portion of said jack comprises a hydraulic cylinder; and said lower portion of said jack comprises an extensible, contractable rod telescopingly carried in said cylinder;
said cylinder being adapted to receive fluid for extending and contracting said rod responsive to the driving force of said fluid in said cylinder.

13. A vehicle leveling system comprising:
 a plurality of longitudinally extendable and contractable leveling members movable between a folded retracted position and an upright extended position;
 each of said leveling members having an upper end portion for attachment to the vehicle and an extendable lower end portion for engagement with the ground;
 means on said upper end for mounting said leveling member on the vehicle including;
 a base;
 a pivot defining a substantially horizontal axis for said leveling member supporting the latter on said base for swinging between said active position and said retracted position;
 means carried by said base for guiding said pivot for back and forth movement along said base transversely of said axis; and
 linkage means connected between said base and said leveling member for swinging said leveling member to said active position and shifting said pivot along said base in one direction in response to extension of said leveling member when the latter is in said retracted position, said linkage means also being responsive to contraction of said leveling member when the latter is in said active position to swing said leveling member back to the retracted position while shifting said pivot back along said base in the opposite direction.

14. The leveling system as defined in claim 13 further including:
 an actuating system for selectively extending and contracting said leveling members; and
 means responsive to the attitude of said vehicle for automatically controlling said actuating system for selectively extending at least one of said leveling members.

15. The vehicle leveling system as defined in claim 13 wherein one end portion of said leveling member comprises a hydraulic cylinder; and
 the other end portion of said leveling member comprises an extensible, contractable rod telescopingly carried in said cylinder;
 said cylinder being adapted to receive fluid for extending and contracting said rod responsive to the driving force of said fluid in said cylinder.

16. The leveling system as defined in claim 14 wherein said actuating system comprises:
 a plurality of electrically operated solenoid valves corresponding to said leveling members, each of said solenoid valves communicating with its corresponding leveling member, and communicating with a source of fluid;
 means for pumping said fluid; and
 said control means including an attitude sensitive switch cooperating with a source of electricity for the purpose of actuating at least one of said solenoid valves to an open position thereby to allow fluid to pass therethrough into its corresponding leveling member to cause the extension thereof into its upright active position, said switch closing said solenoid valves when said vehicle is level.

17. The vehicle leveling system as defined in claim 16 wherein said pump means is reversible to move said fluid in an opposite direction and said control means includes at least one manual switch for opening said solenoid valves whereby said fluid flows first to said cylinders in an opposite direction thereby initiating contraction of said leveling member and the folding thereof into a retracted position.

* * * * *